(12) United States Patent
Ross

(10) Patent No.: US 6,370,892 B1
(45) Date of Patent: Apr. 16, 2002

(54) BATCH PROCESS AND APPARATUS OPTIMIZED TO EFFICIENTLY AND EVENLY FREEZE ICE CREAM

(76) Inventor: Harold F. Ross, 454 Hwy. M 35, Bark River, MI (US) 49807

( * ) Notice: Subject to any disclaimer, the term of this patent is extended or adjusted under 35 U.S.C. 154(b) by 0 days.

(21) Appl. No.: 09/639,062

(22) Filed: Aug. 15, 2000

Related U.S. Application Data

(63) Continuation-in-part of application No. 09/234,970, filed on Jan. 21, 1999, now Pat. No. 6,119,472, which is a continuation-in-part of application No. 09/083,340, filed on May 22, 1998, now Pat. No. 6,101,834, which is a continuation-in-part of application No. 08/869,040, filed on Jun. 4, 1997, now Pat. No. 5,755,106, which is a continuation of application No. 08/602,302, filed on Feb. 16, 1996, now abandoned.

(51) Int. Cl.[7] .................................................. A23G 9/12
(52) U.S. Cl. .............................. 62/136; 62/218; 62/342
(58) Field of Search ............................ 62/218–222, 342, 62/518, 136

(56) References Cited

U.S. PATENT DOCUMENTS

| | | |
|---|---|---|
| 967,503 A | 8/1910 | Davis |
| 1,698,941 A | 1/1929 | Davenport |
| 1,767,857 A | 6/1930 | Sawyer |
| 1,769,113 A | 7/1930 | Davenport |
| 1,791,041 A | 2/1931 | Sawyer |
| 1,818,364 A | 8/1931 | Turnbow |
| 2,070,729 A | 2/1937 | Harsch et al. |
| 2,156,096 A | 4/1939 | Robinson |
| 2,702,460 A | 2/1955 | Gaugler |
| 3,229,647 A | 1/1966 | Von Drachenfels et al. |
| 3,264,836 A * | 8/1966 | Miller et al. .................. 62/342 |
| 3,803,870 A | 4/1974 | Conz |
| 3,952,534 A | 4/1976 | Jacobs |
| 3,961,494 A | 6/1976 | Schaefer et al. |
| 4,052,180 A * | 10/1977 | Erickson ....................... 62/342 |
| 4,094,168 A | 6/1978 | Hamner et al. |
| 4,275,567 A * | 6/1981 | Schwitters ................... 62/136 |
| 4,332,145 A | 6/1982 | Yuhasz et al. |
| 4,383,417 A * | 5/1983 | Martineau .................... 62/136 |
| 4,463,572 A * | 8/1984 | Brown, Jr. .................... 62/342 |
| 4,758,097 A | 7/1988 | Iles, Sr. |
| 5,016,446 A * | 5/1991 | Fiedler ......................... 62/342 |
| 5,158,506 A | 10/1992 | Kusano et al. |
| 5,653,118 A | 8/1997 | Cocchi et al. |
| 6,082,120 A * | 7/2000 | Hoffman et al. .............. 62/342 |
| 6,119,472 A | 9/2000 | Ross |

* cited by examiner

Primary Examiner—William E. Tapolcai
(74) Attorney, Agent, or Firm—Foley & Lardner

(57) ABSTRACT

A batch freezing ice cream machine for cooling liquid ice cream into frozen ice cream includes a flooded evaporator or evaporator having an auxiliary tank or section of the evaporator that can ensure that a cooling chamber is surrounded by liquid refrigerant during normal operation. The mix from the evaporator is placed in a freezer for ripening once it reaches a particular consistency in the evaporator.

14 Claims, 9 Drawing Sheets

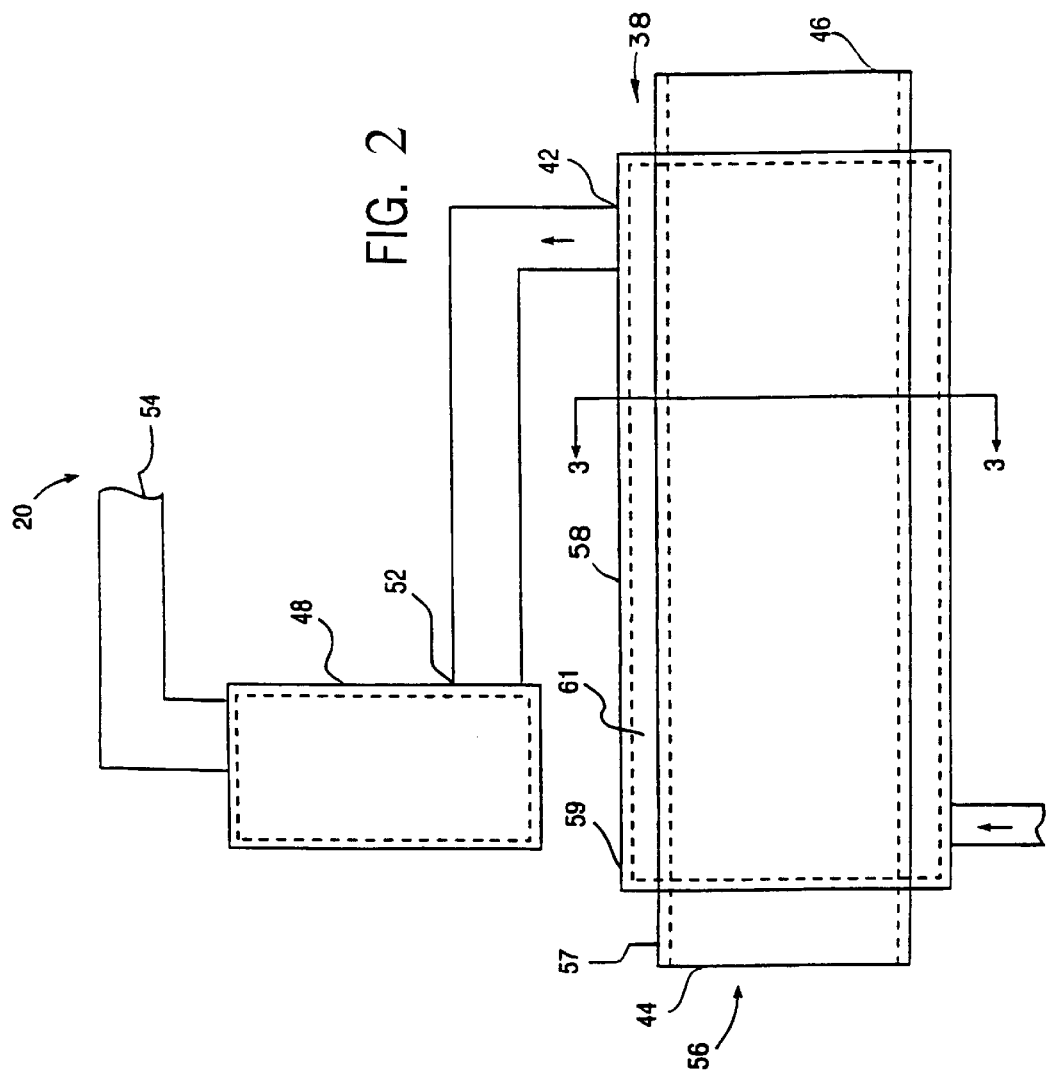
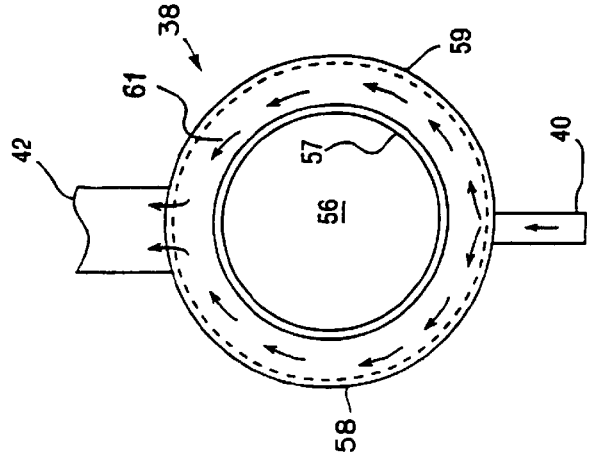

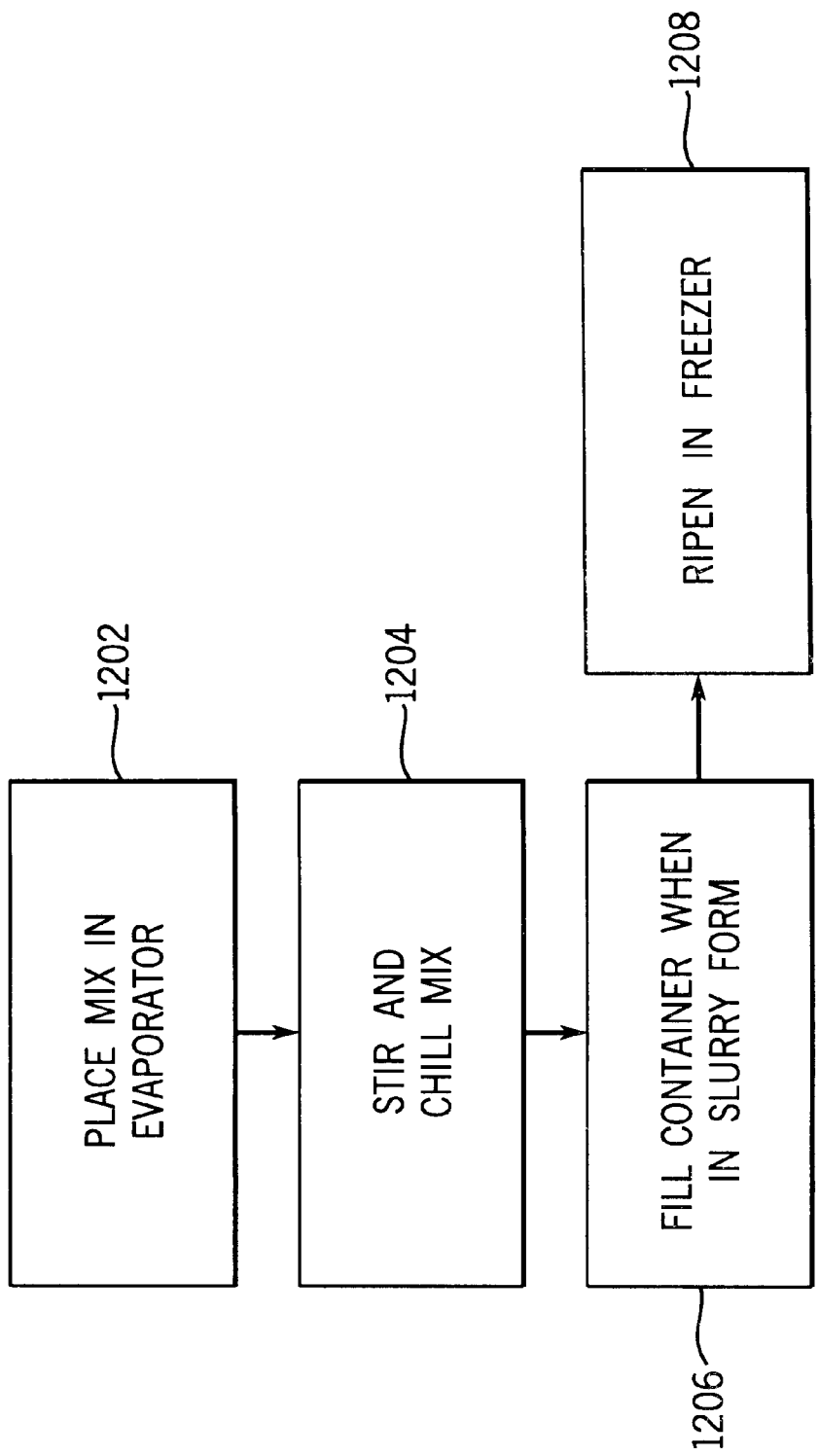

BATCH PROCESS AND APPARATUS OPTIMIZED TO EFFICIENTLY AND EVENLY FREEZE ICE CREAM

CROSS REFERENCE TO RELATED PATENT APPLICATIONS

The present application is a continuation-in-part of U.S. patent application Ser. No. 09/234,970, filed by Ross on Jan. 21, 1999, which is now U.S. Pat. No. 6,119,472, which is a continuation-in-part of U.S. patent application Ser. No. 09/083,340, filed by Ross on May 22, 1998, which is now U.S. Pat. No. 6,101,834, which is a continuation-in-part of U.S. Ser. No. 08/869,040, filed Jun. 4, 1997, which is now U.S. Pat. No. 5,755,106, which was a continuation of U.S. Ser. No. 08/602,302, filed Feb. 16, 1996, abandoned.

FIELD OF THE INVENTION

The present invention relates to refrigeration or cooling systems. More particularly, the present invention relates to a batch freezing process of and a hatch freezer for making custard, ice cream, or other frozen food stuff.

BACKGROUND OF THE INVENTION

Ice cream or frozen custard machines, as well as other systems for cooling or freezing food stuffs, condiments, or other materials, typically include an evaporator situated proximate the material being chilled. For example, in ice cream machines, liquid ice cream (e.g., the mix) is typically inserted in a freezing chamber or barrel associated with the evaporator and is removed from the barrel as solid or semi-solid ice cream. The evaporator removes heat from the freezing chamber as a liquid refrigerant, such as, FREON®, ammonia, R-404a, HP62, or other liquid having a low boiling point, changes to vapor in response to the heat from the liquid ice cream. Typically, the evaporator is partially filled with vapor as the liquid refrigerant boils (e.g., becomes vapor) in the evaporator.

Since most heat transfer occurs when the liquid refrigerant is changed to vapor, the partially filled evaporator is less efficient than a flooded evaporator (e.g., an evaporator filled entirely with liquid refrigerant). The partially filled evaporator also tends to unevenly cool the ice cream because the parts of the evaporator which are filled with vapor are not able to cool as effectively as the parts of the evaporator filled with liquid. Further, prior art ice cream machines are disadvantageous because the temperature does not remain constant in the evaporator due to the accumulation of vapor. The inefficiencies resulting from the partially filled evaporator require a larger, more expensive, and less energy-efficient compressor. The goal of an efficient evaporator is to reduce the quantity of vapor in the barrel to optimize the surface area for liquid refrigerant evaporation. Although there is always a quantity of vaporized refrigerant in the barrel it is essential to minimize stagnation of the vapor within the heat exchange area. By reducing the stagnation of the vaporized refrigerant within the barrel, there is a more efficient transfer of heat. There can be a closer relationship of refrigerant evaporating temperature to ice cream or frozen custard freezing temperature. A result of this closer temperature difference is higher compressor efficiency.

In addition, custard or ice cream quality and efficient manufacture of such custard or ice cream are dependent upon maintaining a constant evaporator temperature (e.g., constant barrel temperature). The barrel temperature must be kept in a proper range for making custard or ice cream so the custard or ice cream. If the custard or ice cream is allowed to become too cold, the mix or liquid ice cream in the evaporator becomes highly viscous and can block the travel of the ice cream through the barrel. Blockage of the barrel in the freezing process is commonly known as "freeze up".

Maintaining the temperature of the barrel at a constant level is particularly difficult, as ice cream flow rates through the machine vary and change the cooling load on the evaporator. For example, more heat dissipation is required as more ice cream is produced (i.e., the flow rate is increased). Additionally, if the barrel temperature is too low, refrigerant flood-back problems can adversely affect the operation of the compressor. For example, if the refrigerant is not fully evaporated as it reaches the compressor, the liquid refrigerant can damage the compressor.

Batch freezing processes and batch freezing systems are often utilized to produce large quantities of frozen food stuffs, such as frozen custard or ice cream. Batch freezing systems can meet a demand of approximately up to 100 to up to 900 servings per hour. Such processes and systems can meet the needs of a single store or stand or be part of a large production operation for multi-store operations.

Conventional batch freezing processes typically utilize a conventional refrigerated barrel-type ice cream maker and a freezing cabinet. The conventional refrigerated barrel utilizes a smooth tube surrounded by refrigeration coils, (e.g., copper tubes wrapped around the smooth tube). For the reasons discussed, such conventional refrigerated barrels are inefficient and do not evenly chill the ice cream as quickly as possible, thereby failing to produce the highest quality ice cream.

In a conventional process, a mix of custard or ice cream is driven through the barrel via an auger. The mix remains in the barrel until it begins to freeze and reaches a "slurry" form (at a temperature of 22° F.). Conventional systems generally require about 10 to 12 minutes to freeze the mix into the slurry form. Once the slurry form is achieved, the mix exits the barrel and falls into (is caught) in a freezing container or bucket. The freezing container is placed in a freezing cabinet where it is brought from a temperature of about 22° F. to about −5° F. The ice cream or custard ripens or is brought to its final temperature in the freezing cabinet.

Thus, there is a need for a batch ice cream machine. Further still, there is a need for a batch process which can more efficiently and more evenly cool ice cream or custard. Even further still, there is a need for a batch freezer or batch process which utilizes a single barrel and yet produces high quality or premium custard and ice cream more quickly.

SUMMARY OF THE INVENTION

An exemplary embodiment relates to a batch freezing ice cream making system. The batch freezing ice cream making system includes an evaporator, a compressor, and a condenser. The evaporator has a refrigerant input and a refrigerant output. The evaporator has an exterior surface and an interior surface. The interior surface defines a cooling chamber, and the exterior surface and the interior surface define an evaporator chamber. The cooling chamber has an ice cream input and an ice cream output. The evaporator chamber is flooded with liquid refrigerant. The compressor has a compressor input and a compressor output. The compressor input is coupled to the refrigerant output. The condenser has a condenser input and a condenser output. The condenser input is coupled to the compressor output, and the condenser output is coupled to the refrigerant input.

Another exemplary embodiment relates to a batch process for making ice cream. The batch process includes chilling a mix in a flooded evaporator and placing the mix in a freezer when the mix reaches a particular consistency. The flooded evaporator has an interior surface defining an interior cooling chamber.

Still another exemplary embodiment relates to a batch frozen custard making system. The batch frozen custard making system includes a freezer and an evaporator system. The evaporator system has an evaporator input and an evaporator output. The evaporator system also has an interior surface defining a cooling chamber. The evaporator system maintains a liquid refrigerant about the cooling chamber. A bucket is filled with the contents of the cooling chamber and placed in the freezer.

BRIEF DESCRIPTION OF THE DRAWINGS

The invention will hereafter be descried with reference to the accompanying drawings, wherein like reference numerals denote like elements, and:

FIG. 2 is a more detailed side view schematic diagram of the cylindrical cooling tank and auxiliary tank illustrated in FIG. 1;

FIG. 3 is a cross-sectional view of the cylindrical cooling tank illustrated in FIG. 2 at line 3—3;

FIG. 13 is a flow diagram of a batch process for use with the batch freezing system illustrated in FIG. 11.

DETAILED DESCRIPTION OF THE PREFERRED EXEMPLARY EMBODIMENT OF THE PRESENT INVENTION

Figure 1:
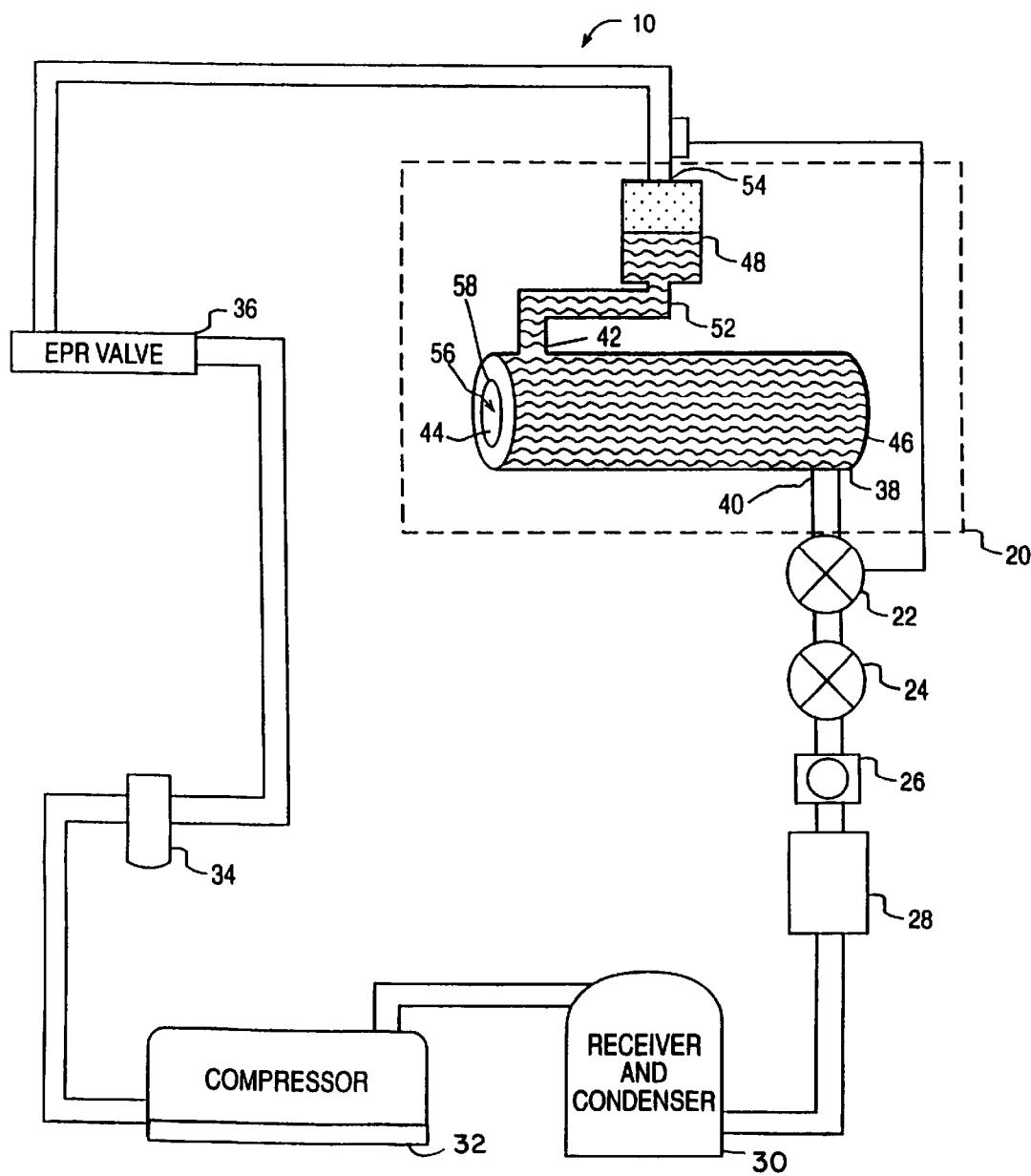
FIG. 1 is a schematic diagram illustrating an advantageous ice cream machine.

A cooling system or ice cream machine 10 is diagrammatically shown in FIG. 1. Ice cream machine 10 includes an evaporator 20, an expansion device 22, such as, a valve, a shut-off device 24, such as, a solenoid valve, a sight glass 26, a filter 28, a condenser 30, a compressor 32, an accumulator 34, and a valve 36. Evaporator 20 includes a cylindrical cooling tank 38 and an auxiliary tank 48. Machine 10 can be manufactured without glass 26, valve 36, or device 24, or accumulator 34.

Cylindrical cooling tank 38 includes a refrigerant input 40, a refrigerant output 42, a liquid ice cream input 44, and a solid ice cream output 46. Auxiliary tank 48 includes a liquid refrigerant input 52 and a vapor refrigerant output 54. Cylindrical cooling tank 38 includes a cooling chamber 56 defined by an interior surface, wall, or tube 57 (FIG. 3) of tank 38.

Auxiliary tank 48 is positioned above with respect to gravity or over cylindrical cooling tank 38. Additionally, liquid refrigerant input 52 is located above refrigerant output 42, and refrigerant input 40 of tank 38 is located beneath refrigerant output 42 of tank 38. Vapor refrigerant output 54 of tank 48 is located above liquid refrigerant input 52 of tank 48.

With reference to FIGS. 2 and 3, a shell or wall 58 of cylindrical cooling tank 38 is manufactured from an outside tube 59 having an inside diameter of 4.5 inches, an outside diameter of 4.75 inches, and a length of 27.75 inches, and an inner tube 57 having an inside diameter of 3.75 inches, an outside diameter of 4.0 inches, and a length of 30 inches. For batch freezing embodiments described below with reference to FIGS. 11–13, the volume of tank 38 can be larger depending on the desired yield. Alternatively, the distance between the outer diameter of tube 57 and the inner diameter of tube 59 can be reduced to 0.25 inches to increase surface velocities. Preferably, wall 58 is 0.125 inches thick. The volume of interior cooling chamber 56 is approximately 377 cubic inches. The volume of an evaporator chamber 61 between outer tube 59 and inner tube 57 is approximately 92.6 cubic inches. Auxiliary tank 48 is preferably a piece of tubing or other container having a length of 12 inches, a width of 3 inches, and a depth of 2 inches. The approximate volume of tank 48 is 72 cubic inches.

The operation of ice cream machine 10 is described below with reference to FIGS. 1–3. Compressor 32 provides high pressure vapor refrigerant to condenser 30. Ice cream machine 10 may utilize a refrigerant, such as, ammonia, FREON®, HP62, or other substance having a low boiling point. The type of refrigerant is not a limiting factor with respect to the present invention.

Condenser 30 provides high pressure liquid refrigerant through filter 28, sight glass 26, and shut-off device 24 to expansion device 22. Expansion device 22 provides low pressure liquid refrigerant to evaporator 20. More particularly, low pressure liquid refrigerant is provided to refrigerant input 40 of cylindrical cooling tank 38. The low pressure liquid refrigerant in cooling tank 38 is boiled, due to the heat from cooling chamber 56, refrigerant will start vaporizing within the barrel which accumulates in auxiliary tank 48. The low pressure liquid refrigerant in cylindrical cooling tank 38 preferably cools or freezes the liquid ice cream received from input 44 in cooling chamber 56. Although ice cream is disclosed, other food stuffs, substances, or condiments may be utilized in machine 10.

More particularly, the warmer liquid ice cream with respect to the liquid refrigerant provided to liquid ice cream input 44 is cooled and provided as frozen ice cream at ice cream output 46, as the low pressure liquid refrigerant is transformed from liquid to vapor. The low pressure vapor refrigerant collects via auxiliary tank 48. Preferably, system 10 is provided with enough liquid refrigerant so that all of cylindrical cooling tank 38 is liquid vapor mix filling barrel and auxiliary tank 48 is two-thirds to one-half filled with liquid refrigerant during normal operation of ice cream machine 10, the top one-third filled with vapor only.

The low pressure vapor refrigerant in tank 48 travels from vapor refrigerant output 54 through valve 36 and accumulator 34 to compressor 32. Compressor 32 changes the low pressure vapor refrigerant to high pressure vapor refrigerant and provides the high pressure vapor refrigerant to condenser 30. Condenser 30 changes the high pressure vapor refrigerant to high pressure liquid refrigerant, which is provided to device 22.

The flooding of tank 38 advantageously provides even cooling as liquid ice cream travels from ice cream input 44 to ice cream output 46 because the temperature and pressure of the low pressure liquid refrigerant in cylindrical cooling tank 38 is maintained constant. Therefore, the ice cream in cooling chamber 56 is chilled evenly wherever it is vertically located within cooling chamber 56. Prior art cooling tanks tended to chill the ice cream unevenly near the top of the evaporator because liquid refrigerant was only located on the bottom of the evaporator because unsaturated vapor tends to stratify on top of the evaporator.

The use of such an advantageous evaporator 20 allows system 10 to be designed with a relatively small compressor 32. The small size of compressor 32 makes ice cream machine 10 less expensive and more energy-efficient. Preferably, auxiliary tank 48 may be a coil of copper tubing located above cylindrical cooling tank 38. Preferably, auxiliary tank 48 is a tank located above cylindrical cooling tank 38, such as, a cylindrical or spherical tank, reservoir, can, or other container. Cylindrical cooling tank 38 preferably has almost three times the volume of auxiliary tank 48.

With reference to FIGS. 4–7, alternative embodiments for an advantageous evaporator 20 are described as follows. The embodiments of evaporator 20 shown in FIGS. 4–7 replace evaporator 20 in system 10 described with reference to FIG. 1, wherein like numerals denote like elements. However, the various dimensions given with respect to FIG. 1 can be adjusted and modified in accordance with the operational principles of the present invention. Evaporators 20 shown in FIGS. 4–7 advantageously do not include a separate auxiliary evaporator, such as, auxiliary tank 48 shown in FIG. 1. Instead, evaporators 20 are advantageously shaped so that cooling chamber 56 is completely surrounded by liquid refrigerant as vapor accumulates above chamber 56 (e.g., at the top of evaporator 20).

Figure 4:
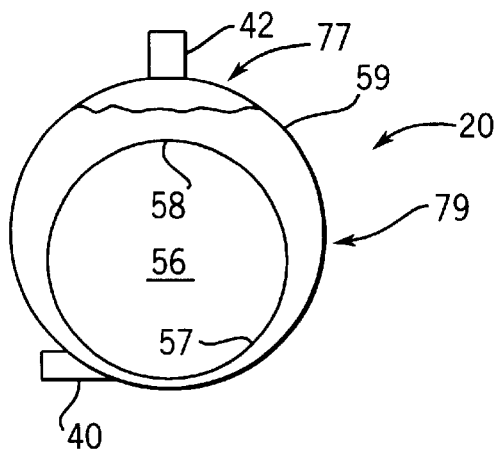
FIG. 4 is a cross-sectional view of an alternative evaporator for use in a system similar to the system illustrated in FIG. 1.

With reference to FIG. 4, evaporator 20 includes a first portion 77 that collects vapor refrigerant and a second portion 79 that contains liquid refrigerant and completely surrounds cooling chamber 56. First portion 77 is above second portion 79 with respect to gravity. Evaporator 20 in FIG. 4 is configured by lowering inside tube 57 with respect to outside tube 59 (e.g., inside tube 57 is not concentric with outside tube 59). Tube 59 can be adjusted to be larger to ensure that liquid refrigerant completely surrounds inner tube 57. Refrigerant output 42 is located above refrigerant input 40 with respect to gravity.

Figure 5:
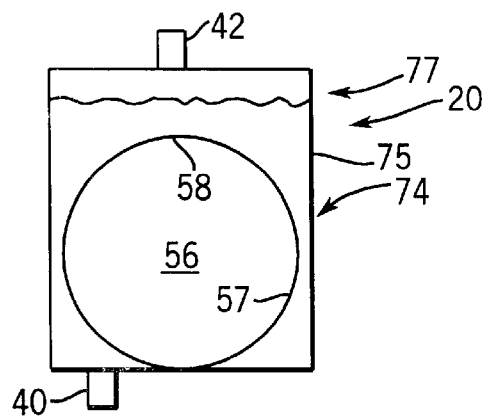
FIG. 5 is yet another cross-sectional view of an alternative evaporator for use in a system similar to the system illustrated in FIG. 1.

With reference to FIG. 5, tube 57 is provided in an outer section 75. Outer section 75 has a rectangular cross-sectional area instead of the circular cross section of tube 59 (FIG. 3). Outer section 75 has a substantially greater height than tube 57 to ensure that second portion 79 can completely contain tube 57. In this way, cooling chamber 56 is completely surrounded by liquid refrigerant.

Figure 6:
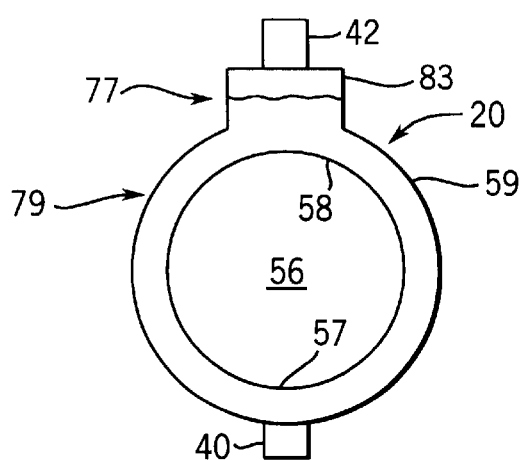
FIG. 6 is yet another cross-sectional view of an alternative evaporator for use in a system similar to the system illustrated in FIG. 1.

In FIG. 6, outer tube 59 includes a rectangular section 83 provided at the top of outer tube 59. Rectangular chamber 83 replaces auxiliary tank 48 with reference to FIGS. 1–3. Vapor refrigerant is accumulated in first portion 77 associated with rectangular chamber 83, and second portion 79 has liquid refrigerant which completely surrounds cooling chamber 56.

Figure 7:
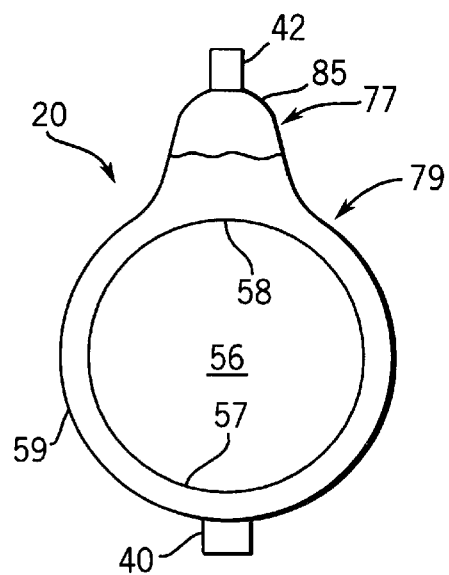
FIG. 7 is still another cross-sectional view of an alternative evaporator for use in a system similar to the system illustrated in FIG. 1.

With respect to FIG. 7, evaporator 20 is similar to evaporator 20 discussed with reference to FIG. 6. However, a spherical or cylindrical chamber 85 is provide at a top of outer tube 59. Chamber 85 operates similarly to chamber 83, discussed with reference to FIG. 6.

Figure 8:
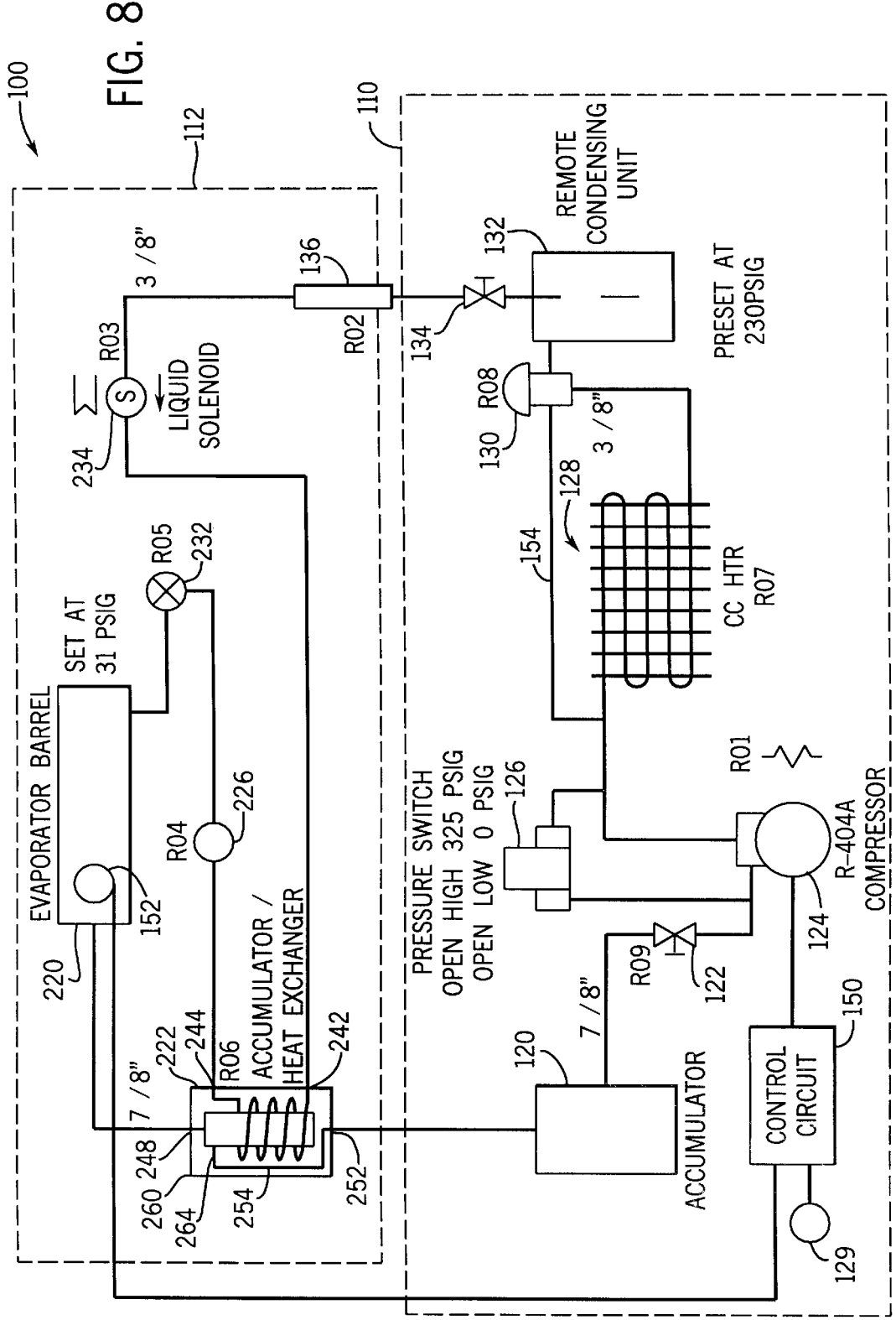
FIG. 8 is a schematic block diagram of an ice cream machine in accordance with an exemplary embodiment of the present invention.

With reference to FIG. 8, an ice cream machine or frozen custard making machine 100 is schematically shown including a remote section 110 and an evaporator section 112. Remote section 110 can be physically apart from section 112. Preferably, evaporator section 112 is located inside an ice cream machine building or custard stand, and remote section 110 is located external to the ice cream machine building.

Remote section 110 includes an accumulator 120, a valve 122, a compressor 124, a pressure switch 126, a condenser 128, a pressure control valve 130, a remote condensing unit 132, and a valve 134. Valves 122 and 134 are preferably manually actuated shut-off valves. Pressure switch 126 is in parallel with compressor 124 and coupled between valve 122 and condenser 128. Switch 126 provides a safety sensing point to shut the compressor off if too high or low a pressure condition exists.

For example, switch 126 can be configured to open when refrigerant pressure from valve 122 is greater than 325 pounds per square inch gauge (PSIG) or when the pressure of the refrigerant from valve 122 is approximately 0 pounds PSIG. Switch 122 protects compressor 124 and machine 100 from refrigerant overpressure and underpressure. Settings will vary with refrigerant type used and components selected.

Evaporator section 112 includes evaporator 220, accumulator/heat exchanger 222, sight glass 226, automatic expansion valve 232, liquid solenoid 234, and filter/dryer 136. Temperature sensor 152 can be adjacent to a barrel or interior chamber for freezing ice cream associated with evaporator 220. Evaporator 220 can be similar to evaporators discussed with reference to FIGS. 1–7. Alternatively, evaporator 220 can be a conventional evaporator barrel.

Compressor 124 is controlled by a control circuit 150 that is coupled to a temperature sensor 152. Control circuit 150 turns compressor 124 and a lamp 129 on and off in response to a temperature signal from sensor 152. Sensor 152 is preferably positioned to sense ice cream, refrigerant, or other temperature associated with evaporator 220. Control circuit 150 preferably includes relay switches which provide power to lamp 129 and to compressor 124.

Compressor 124 provides vapor refrigerant through condenser 128 to valve 130. Valve 130 is preferably a constant head pressure control valve. A hot gas bypass path 154 is located in parallel with condenser 128 between compressor 124 and valve 130. Valve 130 receives liquid refrigerant from condenser 128 and provides liquid refrigerant to remote condensing unit 132. Remote condensing unit 132 is preferably an air-cooled condenser unit or alternately water cooled.

Valve 130 manipulates refrigerant flow, sending it either through bypass path 154 or to condensing unit 132. Preferably, valve 130 provides refrigerant at a constant pressure depending on refrigerant used to unit 132. Valve 130 can be a pressure actuated valve manufactured by Sporlan Valve Company. Valve 130 automatically toggles versus pressure and spring tension.

Condensing unit 132 is a receiver tank mounted on condenser 128. The refrigerant preferably accumulates as a liquid (e.g., puddles up) in unit 132. Liquid refrigerant is provided through valve 134 to a filter/dryer 136.

Filter dryer 136 absorbs moisture, acids, chips, and debris from the liquid refrigerant provided through valve 134. Liquid refrigerant travels through solenoid 234, which operates as an electrically controlled on and off valve (solenoid can be on inlet or outlet of evaporator). The liquid refrigerant is provided through accumulator/heat exchanger 222 to sight glass 226.

Accumulator/heat exchanger 222 is preferably manufactured by Refrigeration Research, Inc. and includes an input 242, an output 244, an input 248, and an output 252. Input 242 is coupled to solenoid 234 and to an internal path 254 that is coupled to output 244. Path 254 wraps around a path 260 coupled between input 258 and output 252.

Path 260 is preferably an eight-inch diameter, 24-inch high cylindrical enclosure. Path 260 has an opening 264 coupled to output 252. Opening 264 is located near a top end of path 260.

Liquid refrigerant from output 244 is provided through site glass 226 to automatic expansion valve 232. Automatic expansion valve 232 is pressure actuated in response to downstream pressure (pressure from evaporator 220). Valve 232 is different than conventional expansion valve 22 discussed with reference to FIG. 1. Expansion valve 22 is a temperature expansion valve that provides more refrigerant flow in response to temperature increases and less refrigerant flow in response to temperature decreases. In contrast, automatic expansion valve 232 provides liquid refrigerant in response to pressure. In bath freezing applications described below with reference to FIGS. 11–13, expansion valve 22 can be an automatic thermostatic expansion valve. When the downstream pressure is low, more refrigerant is provided by valve 232. When the downstream pressure is high, less pressure is provided by valve 232. In this way, valve 232 is a metering device which senses pressure in evaporator 220 and maintains pressure in evaporator 220 at a consistent level.

Valve 232 can be spring-actuated and is preferably set to maintain the refrigerant in evaporator 220 at a constant 31 PSIG pressure level (approximately 0° Fahrenheit). Settings will vary with refrigerant type used and components selected. The use of expansion valve 232 allows machine 100 to achieve superior performance as loads on evaporator 220 change. For example, as rates of mix in evaporator 220 change, temperature of the barrel in evaporator 220 can fluctuate if valve 232 is not present. Valve 232 maintains the pressure of refrigerant constant in evaporator 220, and, hence, the temperature constant in evaporator 220.

Vapor refrigerant or liquid and vapor refrigerant is provided from evaporator 220 to input 248 of accumulator/heat exchanger 222. Liquid refrigerant falls to the bottom of path 260, while vapor refrigerant escapes through opening 264 to output 252. In this way, refrigerant along path 254 is cooled by the liquid refrigerant in path 260. This cooling process also heats the liquid refrigerant in path 260 which then is provided as vapor through opening 264. Liquid refrigerant is prevented from reaching the optical accumulator 120 as liquid refrigerant is boiled off and provided as vapor. Therefore, accumulator/heat exchanger 222 provides both efficiency and safety by protecting compressor 124 from receiving liquid refrigerant.

Vapor refrigerant from output 252 is provided to accumulator 120, which provides vapor through valve 122 to compressor 124. Connections between evaporator 220, accumulator/heat exchanger 222, accumulator 120, and compressor 124 are sized for refrigeration capacity levels typically ⅞-inch copper tubing. Connections between compressor 124, valve 130, unit 132, valve 134, filter 136, solenoid 234, and input 242 are sized for capacity levels typically ⅜-inch copper tubing. Additionally, connections between output 244, sight glass 226, expansion valve 232 and evaporator 220 are sized for capacity levels typically ⅜ inch copper tubing. Path 254 is preferably ⅜-inch copper tubing.

Control circuit 150 and temperature sensor 152 provide two control functions, a hold mode and a monitor mode, for machine 100. The operator initiates the mode, when machine 100 is turned off with custard or ice cream within the barrel of evaporator 220. To avoid bacterial growth in the custard mix within the barrel and to improve initial starting speed, a hold mode is installed. In the hold mode, control circuit 150 monitors the temperature of evaporator 220 via sensor 152 and, when a temperature is reached in which the ice cream begins to melt (approximately 28 degrees), control circuit 150 turns on compressor 124, and machine 100 begins cooling the ice cream. Once the temperature of the ice cream falls below a certain temperature, such as, 27 degrees Farenheit, control circuit 150 turns off compressor 124. Temperature sensor 152 can monitor the temperature of refrigerant travelling to input 248, the temperature of the ice cream, and the temperature of an interior or exterior chamber of evaporator 220 to ascertain the temperature in the barrel.

In the monitor mode, control circuit 150 monitors the temperature associated with evaporator 220. If the temperature is too low (all refrigerant is not being evaporated), machine 100 is operating inefficiently, the barrel of evaporator 220 is empty (e.g., the ice cream mix has run out), machine 100 is clogged, or some other change in the mix or load on evaporator 220 has occurred. In such a case, control circuit 150 turns compressor 124 off and provides an indication to the operator that the system should be checked. The indication can be provided through lamp 129 or by an audio alarm. In this way, in the monitor mode, control circuit 150 can prevent freeze-ups in the barrel of evaporator 220.

The combination of automatic expansion valve 232 (or a thermostatic expansion valve), heat exchanger 222, and control circuit 150 advantageously makes the operation of machine 100 significantly easier. Efficient use of machine 100 is almost guaranteed due to the constant pressure provided by valve 232, the boiling of liquid refrigerant in path 260 by accumulator/heat exchanger 222, and the temperature control by control circuit 150. With such a system, the applicant has observed significantly increased simplicity of operating machine 100. The efficiency can be augmented by utilizing an evaporator 220 similar to evaporators discussed with reference to FIGS. 1–7.

Figure 9:
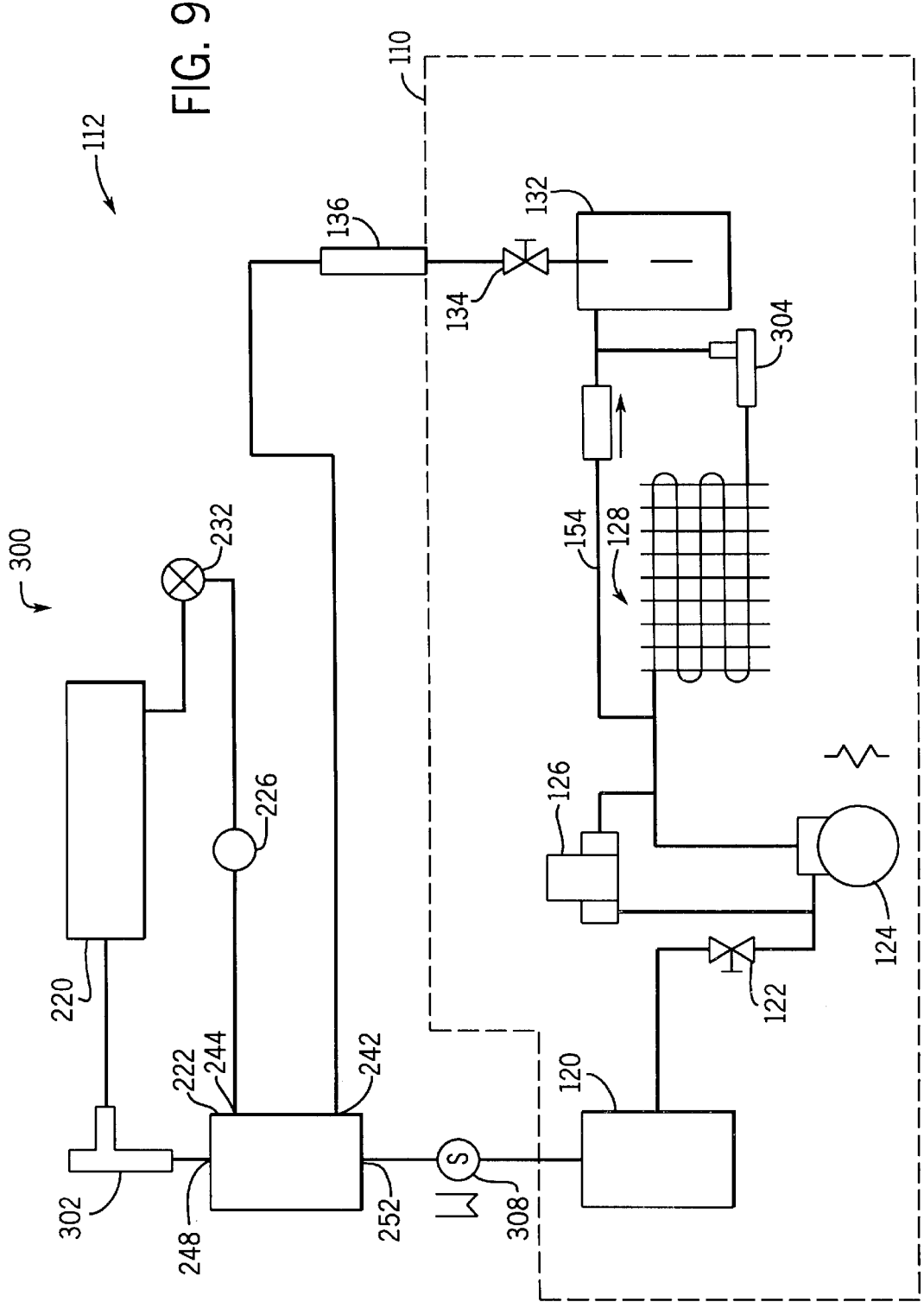
FIG. 9 is a schematic block diagram of yet another ice cream machine in accordance with another exemplary embodiment of the present invention.

With reference to FIG. 9, an ice cream or frozen custard making machine 300 is schematically shown. Machine 300 is substantially similar to machine 100 described with reference to FIG. 8 wherein like numerals denote like elements. System 300 includes a crank case regulator 302, a crank case regulator 304, and a suction solenoid 308. Solenoid 308 is coupled between output 252 of heat exchanger 222 and accumulator 120. Solenoid 302 prevents liquid refrigerant from reaching compressor 124 during maintenance, shutdown or other procedures.

Switch 126 is configured to open at low pressures i.e., 5 PSIG and close or reset at pressures of 20 PSIG. Regulator 304 is set to a pressure of 235 PSIG. Regulator 302 is set to a pressure of approximately 25 PSIG. Expansion valve 232 is set to a pressure of approximately 35 PSIG. (If a thermostatic expansion valve is used, the valve is not set to a pressure.) Settings will vary with refrigerant type used and components selected. Regulators 302 and 304 are preferably spring loaded pressure regulators, such as, crankcase pressure regulating valves manufactured by Sporlan Valve Company. Regulators 302 and 304 provide more predictable pressure of refrigerant in machine 300. Machine 300 can include a control circuit 150 and temperature sensor 152 (FIG. 8).

Figure 10:
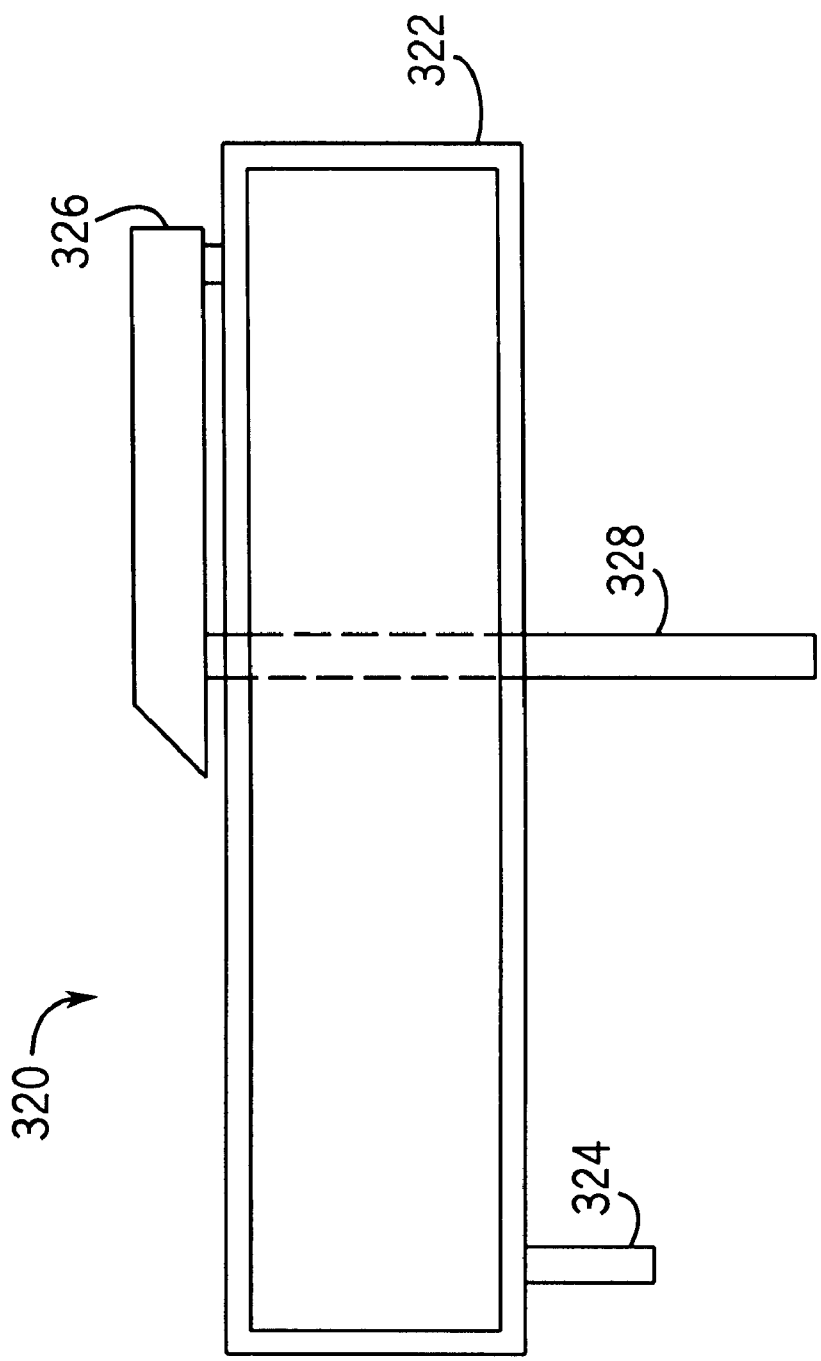
FIG. 10 is cross sectional view of still another alternative evaporator for use in a system similar to the system illustrated in FIG. 1.

With reference to FIG. 10, yet another alternative embodiment for an evaporator for an ice cream custard machine is shown. In FIG. 10, an evaporator barrel 320 which includes a custard barrel 322 with a refrigerant input 324 and an accumulator 326 which includes a refrigerant output 328. Refrigerant input 324 is located below accumulator 326 and refrigerant output 328 with respect to gravity. Liquid ice cream or custard enters barrel 322 and leaves barrel 322 as frozen custard. The liquid ice cream is cooled by refrigerant traveling between input 324 and output 328. Accumulator 326 operates as an auxiliary evaporator or auxiliary tank similar to tank 48 discussed with reference to FIG. 1. Accumulator 326 is preferably tilted slightly upward with respect to gravity and is shaped as shown in FIG. 10 to reduce space requirements. Accumulator 326 is higher at the end with output 328. Preferably, refrigerant output 328 is connected on a top side of accumulator 326. Evaporator 330 can be utilized in machine 200 or machine 300 described with reference to FIGS. 8 and 9.

Figure 11:
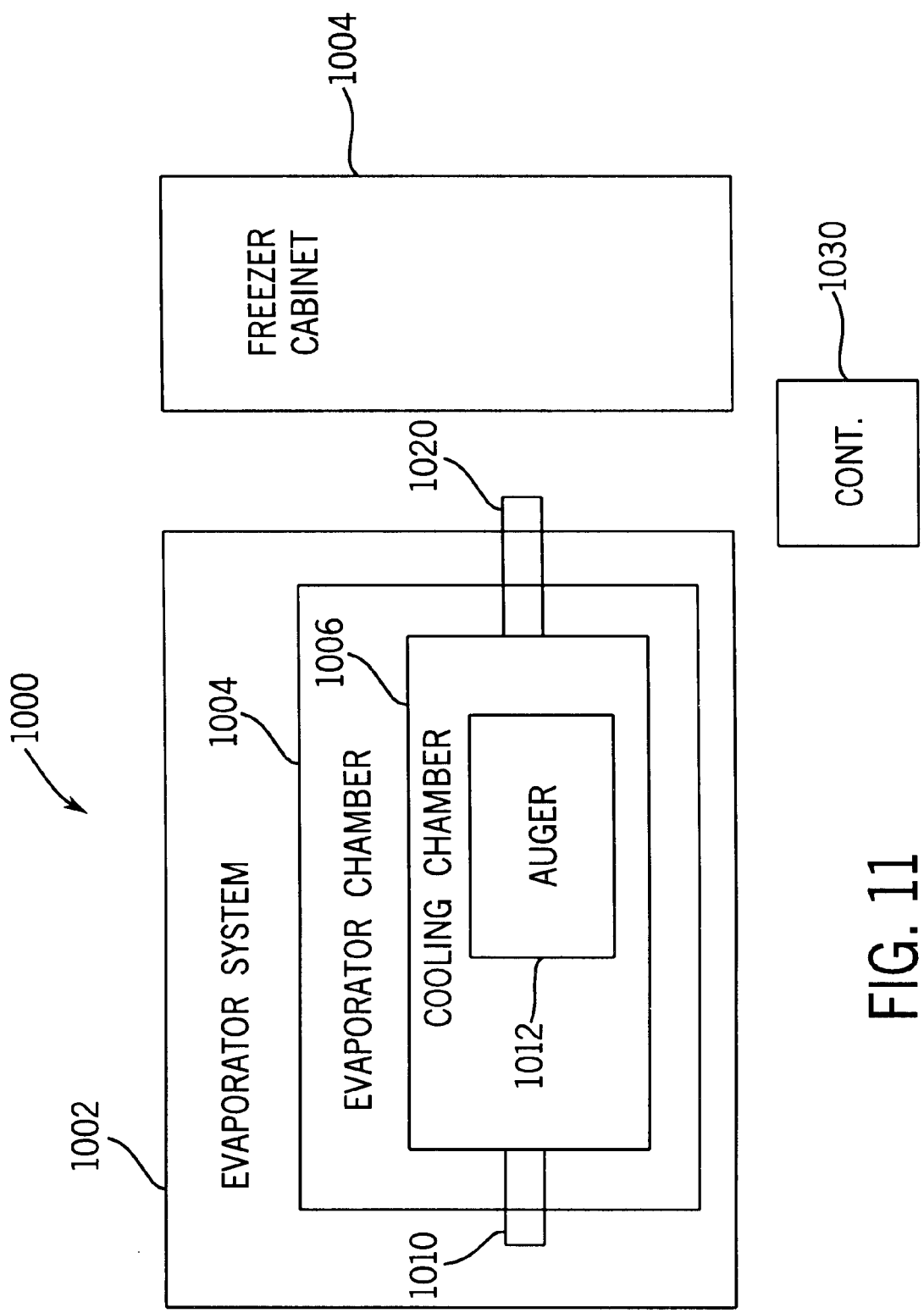
FIG. 11 is a schematic block diagram showing a batch freezing system in accordance with an exemplary embodiment.

In FIG. 11, a batch freezing system or bulk ice cream making system 1000 includes an evaporator system 1002 and a cabinet freezer 1004. Evaporator system 1002 can be similar to any of the evaporators discussed with reference to FIGS. 1–10. Preferably, evaporator system 1002 is a flooded evaporator system including an evaporator barrel defining an evaporator chamber 1004 and a cooling chamber 1006.

Cooling chamber 1006 is defined by interior walls, and evaporator chamber 1004 is defined by cooling chamber 1006 and exterior walls. Cooling chamber 1006 includes an ice cream input 1010 and an ice cream output 1020. A mix of ice cream or custard is provided to ice cream input 1010 and chilled in cooling chamber 1006. Cooling chamber 1006 can include an auger 1012 which mixes the mix in cooling chamber 1006. In addition, auger 1012 can be utilized to transport the mix from an end of chamber 1006 associated with input 1010 to an end of chamber 1006 associated with output 1020. Preferably, auger 1012 is driven by a motor or other device and the mix remains in cooling chamber 1006 until it reaches an appropriate consistency.

The mix remains in chamber 1006 until it reaches a "slurry" form or texture which typically occurs at temperatures of 22° F. Once the slurry form is reached, the mix exits output 1020 and is placed into a container 1030. A number of means can be utilized to determine when the mix is in slurry form. For example, the consistency or texture of the mix in cooling chamber 1006 can be electronically monitored. In another scheme, the temperature of the mix can be monitored via temperature sensors. In another alternative, operator observation can determine when the mix is a slurry form.

Once container 1030 is filled, it is placed in cabinet freezer 1004. The cabinet freezer can be any type of cooling system. Preferably, the cabinet freezer is operated between temperatures 22° F. to −5° F. (most preferably, cabinet freezer is set to −20° F. to bring the ice cream temperature to −5° F.). Once container 1030 is in cabinet freezer 1004, the mix in slurry form is allowed to ripen to become the appropriate temperature for ice cream.

Evaporator system 1002 has significant advantages over conventional evaporation systems utilized in batch freezers. The convention evaporator system utilized in the batch freezer typically utilize a barrel surrounded by copper tubes. In contrast, as discussed with reference to FIGS. 11, system 1000 utilizes an evaporator system having a flooded evaporator in which liquid refrigerant surrounds cooling chamber 1006. The various designs described with reference to FIGS. 1–10 can be utilized for such an evaporator system. The use of such an evaporator system cools the mix faster which increases the efficiency of the system and makes ice cream products with smaller ice crystals. The smaller ice crystals provide a smoother texture or consistency for the product. Customers prefer a smooth consistency for ice cream and custard products. Generally, the mix can react slurry form in less than ten minutes.

Figure 12:
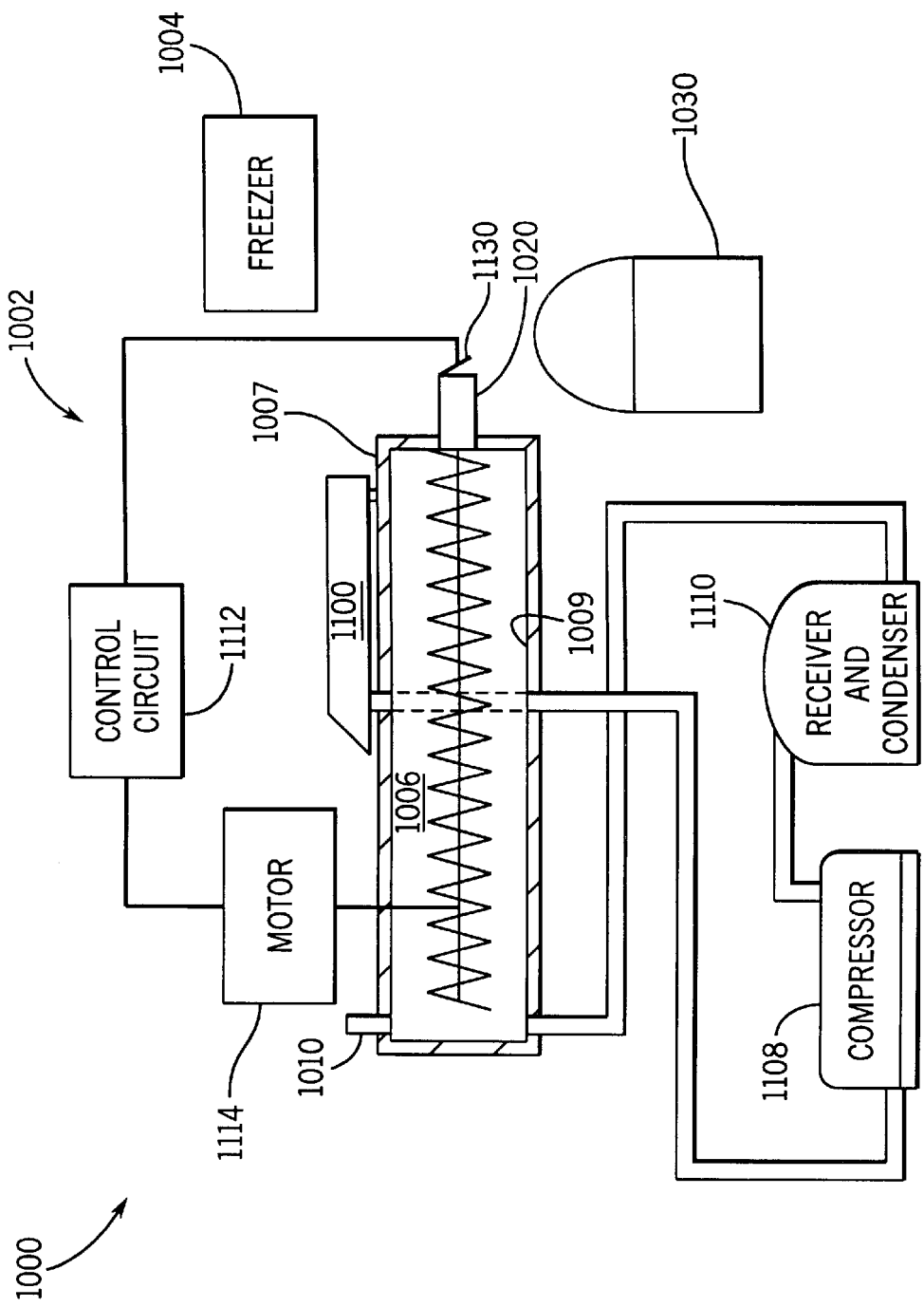
FIG. 12 is a more detailed schematic block diagram showing the batch freezing system illustrated in FIG. 11.

With reference to FIG. 12, system 1000, is shown in more detail. Evaporator system 1002 includes an auxiliary evaporator 1100 and a barrel and a barrel evaporator 1102. The system 1002 also includes a compressor 1108, a condenser 1110, a control circuit 1112, and a motor 1114. The condenser 1110 has an output coupled to an input of evaporator 1102 and compressor 1108 has an input coupled to an output of auxiliary evaporator 1100. Condenser 1110 has an input coupled to an output of compressor 1108.

Evaporator 1102 can include a 10.75 inch inner diameter outer tube 1007 and a 10 inch inner diameter inner tube 1009. The wall of tube 1009 is 0.125 inches thick, and the wall of tube 1007 is 0.25 inches thick. Tube 1009 is preferably 20 inches long, and tube 1007 is preferably 18 inches long. According to another embodiment, compressor 1108 can be coupled to a top of the right side (non-pointed side in FIG. 12) of evaporator 1100 and a bottom of left side can be coupled to the bottom of the left side of evaporator 1100.

A control circuit 1112 is electrically coupled to motor 1114 and to a gate 1130. Gate 1130 is mechanically coupled to ice cream output 1020. Motor 1114 drives auger 1012. As the texture or consistency of the mix in coolant chamber 1006 increases, motor 1114 requires more current to turn at the same speed. Control circuit 1112 monitors the current to motor 1114 and opens gate 1130 when the current indicates that the mix has reached a desired consistency. The use of measuring amperage through a motor to determine ice cream consistency has been utilized in conventional ice cream makers. Control circuit 1112 can automatically provide an indication that the consistency has been reached and automatically open gate 1130.

Upon opening gate 1130, the mix which is in slurry form enters container 1030. Container 1030 can be automatically placed or manually placed in freezer 1004 for ripening.

With reference to FIGS. 12 and 13, a process for manufacturing ice cream includes placing a mix in an interior cooling chamber 1006 at a step 1202. At a step 1204, auger 1012 is utilized to stir the mix in cooling chamber 1006. Preferably, the mix is cooled in a flooded evaporator such as evaporator system 1002. Once the mix reaches a texture or consistency associated with a slurry form (e.g. in approximately less than 10 minutes and at a temperature 22° F.), the mix is removed and placed in a container 1030, such as, a bucket. Gate 1130 can be automatically opened in a step 1206 to allow the mix in slurry form to accumulate in container 1030. Generally, auger 1012 can be utilized to push the mix out of output 1020 when gate 1130 is opened. At a step 1208, container 1030 is transferred to freezer 1004 either automatically or manually for ripening. Generally, ripening occurs at a temperature between 22° F. to −5° F. Most preferably, the cabinet freezer set to −20° F. to bring the ice cream to a temperature of −20° F.

The term "coupled", as used in the present application, does not necessarily mean directly attached or connected. Rather, the term "coupled" in the present application means in fluid or electrical communication with. Two components may be coupled together through intermediate devices. For example, the evaporator input is coupled to the condenser output even though the expansion valve, accumulator/heat exchanger, and sight glass are situated between the evaporator input and the condenser output.

It is understood that, while the detailed drawings and specific examples given to describe the preferred exemplary embodiment of the present invention, they are for the purpose of illustration only. The apparatus of the invention is not limited to the precise details and conditions disclosed. For example, although food stuffs and ice cream are mentioned, the invention may be utilized in a variety of refrigeration or cooling systems. Further, single lines for carrying liquid refrigerant can represent multiple tubes. Additionally, although a particular valve, accumulator, compressor, condenser, and filter configuration is shown, the advantageous machine can be arranged in other configurations. Further still, the evaporator barrel and freezer can have any number of shapes, volumes, or sizes. Various changes can be made to the details disclosed without departing from the spirit of the invention, which is defined by the following claims.

What is claimed is:

1. A batch frozen custard making system, comprising:
   a freezer; and
   an evaporator system having an evaporator input and an evaporator output, the evaporator system having an interior surface defining a cooling chamber, the evaporator system maintaining a liquid refrigerant about the cooling chamber, wherein the cooling chamber includes an auger for mixing contents of the cooling chamber, wherein the auger can push the contents to an exit of the cooling chamber, wherein the exit is automatically opened when the contents reach a slurry form, wherein the contents have a temperature of approximately 22 degrees F. when in the slurry form, wherein a container is filled with contents of the cooling chamber and placed in the freezer, the freezer being set to a temperature of approximately −20 degrees F. for ripening.

2. The frozen custard making system of claim 1, wherein the freezer is a cabinet freezer.

3. The frozen custard making system of claim 2, wherein the evaporator system includes an auxiliary evaporator.

4. The batch frozen custard making system of claim 1, further comprising:
   a temperature sensor coupled to determine a temperature associated with the evaporator system and to generate a temperature signal; and
   a control circuit coupled to the temperature sensor, the control circuit providing indicia if the temperature signal is below a threshold.

5. The frozen custard making system of claim 4, wherein the indicia is illumination of a warning light.

6. The frozen custard making system of claim 1, wherein the exit includes a gate.

7. The frozen custard making system of claim 6, wherein the gate is opened when the contents reach the slurry form in response to a temperature signal representative of 22 degrees F.

8. A batch freezing ice cream making system, comprising:
   an evaporator having a refrigerant input and a refrigerant output, the evaporator having an exterior surface and an interior surface, the interior surface defining a cooling chamber, the interior cooling chamber having an ice cream input and an ice cream output, wherein the cooling chamber includes an auger for mixing contents of the cooling chamber, wherein the auger can push the contents to the ice cream output of the cooling chamber, wherein the ice cream output is automatically opened when the contents reach a slurry form, wherein the contents have a temperature of approximately 22 degrees F. when in the slurry form, the exterior surface and the interior surface defining an evaporator chamber, the evaporator chamber being flooded with liquid refrigerant;
   a compressor having a compressor input and a compressor output, the compressor input being coupled to the refrigerant output and a compressor output;
   a condenser having a condenser input and a condenser output, the condenser input being coupled to the compressor output and the condenser output being coupled to a valve having a valve input; and
   a freezer for receiving the contents from the cooling chamber, the freezer being set to a temperature of approximately −20 degrees F. for ripening.

9. The batch freezing ice cream making system of claim 8, wherein the evaporator includes an auxiliary evaporator means for minimizing accumulation of vapor around the interior chamber by collecting refrigerant in a vapor form.

10. The batch freezing ice cream making system of claim 8, further comprising:
    a motor coupled to the auger, the motor driving the auger.

11. The batch freezing ice cream making system of claim 10, further comprising a control circuit providing a control signal when a mix in the cooling chamber reaches a consistency.

12. The batch freezing ice cream making system of claim 11, wherein the control circuit provides the control signal in response to a current through the motor.

13. The batch freezing making system of claim 8, further comprising an accumulator/heat exchanger.

14. The batch freezing making system of claim 8, wherein the freezer is a cabinet freezer, wherein the contents exiting the ice cream output is automatically placed in the cabinet for ripening.

* * * * *

UNITED STATES PATENT AND TRADEMARK OFFICE
CERTIFICATE OF CORRECTION

PATENT NO.   : 6,370,892 B1
DATED        : April 16, 2002
INVENTOR(S)  : Harold F. Ross It is certified that error appears in the above-identified patent and that said Letters Patent is hereby corrected as shown below:

Column 11,
Line 45, after "with", insert -- the --.
Lines 49 and 51, before "frozen", insert -- batch --.

Column 12,
Lines 1, 3 and 5, before "frozen", insert -- batch --.
Line 57, after "cabinet", insert -- freezer --.

Signed and Sealed this

Sixteenth Day of July, 2002

Attest:

Attesting Officer

JAMES E. ROGAN
Director of the United States Patent and Trademark Office